United States Patent [19]

Nestor et al.

[11] 4,416,063

[45] Nov. 22, 1983

[54] GOLDEN PROPORTION CALIPERS

[76] Inventors: Jack Nestor, 110 1st Ter., Miami Beach, Fla. 33139; William A. Shoemaker, Jr., 6860 SW. 96th St., Miami, Fla. 33156

[21] Appl. No.: 353,960

[22] Filed: Mar. 2, 1982

[51] Int. Cl.³ ............................................. G01B 5/14
[52] U.S. Cl. ................................. 33/163; 33/143 R; 33/154 F
[58] Field of Search ............. 33/143 R, 143 C, 147 G, 33/149 R, 149 B, 150, 154 R, 154 F, 159, 163, 154 G, 164 C, 164 D

[56] References Cited

U.S. PATENT DOCUMENTS

| | | | |
|---|---|---|---|
| 1,201,342 | 10/1916 | Peck | 33/150 |
| 1,280,379 | 10/1918 | Bonney | 33/191 |
| 1,303,471 | 5/1919 | Gross | 33/149 B |
| 1,667,562 | 4/1928 | Neubauer | 33/164 D |
| 2,547,354 | 4/1951 | Worden | 33/191 |
| 2,559,280 | 7/1951 | Cochran | 33/191 |
| 3,026,624 | 3/1962 | Clay | 33/159 |
| 3,151,398 | 10/1964 | Torrey | 33/143 K |

*Primary Examiner*—Willis Little
*Attorney, Agent, or Firm*—Erwin M. Barnett

[57] ABSTRACT

A proportional divider comprises a reference index located between a pair of variable indices and a sectionalized threaded spindle having opposite end sections with reverse threads and of different pitches in a ratio approximating 1 to 0.618. Each spindle section threadingly engages a support for one of the variable indices whereby rotation of the spindle simultaneously adjusts the distances between each variable index and the reference, the distances being maintained in said ratio which is known as the "golden proportion". In one form of divider, the supports for the variable indices are retained for movement along a straight track, the reference and variable indices being portions of pointers extending perpendicularly to the track, the reference pointer being fixed and the variable pointers being mounted on said supports. A plurality of interchangeable reference pointers and variable pointers provide versatility to the divider. In another form of divider, a pair of legs pivoted at one end serve as the supports and mount the variable indices at the free ends thereof. The legs and spindle, which controls the separation of the legs, are all coplanar. The reference index is supported for movement along a reference axis parallel to but spaced from the plane of the legs.

16 Claims, 14 Drawing Figures

GOLDEN PROPORTION CALIPERS

BACKGROUND OF THE INVENTION

1. Field of the Invention

This invention relates generally to proportional dividers or calipers and more particularly is directed to such dividers having a fixed ratio predetermined by the "golden proportion" which has been determined to relate directly to the arithmetic progression of the Fibonacci series of numbers, that is, the proportion of 1 to 0.618.

2. Description of the Prior Art

The "golden proportion", also often referred to as the "divine proportion", has long been recognized to occur in nature in both form and function and has been shown to exist in physiology as well as forming the basis of our aesthetic sense of human anatomy and, therefore, can be particularly useful to those professionals engaged in dental and surgical reconstruction as well as to sculptors and those in the graphic arts. The book entitled "THE DEVINE PROPORTION A Study In Mathematical Beauty" by H. E. HUNTLEY, published by Dover Publications, Inc. is one in many on the subject and thoroughly presents and discusses most if not all aspects of the "golden proportion".

Golden proportion calipers previously described in the literature offer, at best, an approximation and lack the versatilty required for measuring and ascertaining both small and large proportions, small being represented by the incisors in the dental arch, while large is exemplified by the entire head, and also lack the versatility for handling measurements involving large three-dimensional objects.

SUMMARY OF THE INVENTION

Among the objects of the invention is to provide specialized proportional dividers for taking measurements of and laying out the three related lengths, spacings or distances involved in the "golden proportion", namely, the major length, the minor length and the total length, that is, the sum of the major and minor lengths, and when given one of the three lengths, for determining the other two lengths. The dividers shall incorporate means for easily and precisely varying and adjusting, in accordance with the "golden proportion", the major and minor lengths represented by distances between a fixed or reference index and a pair of movable indices positioned on opposite sides of the reference index, shall be constructed to provide the necessary versatility for making both small and large measurements, and shall be practical, efficient and dependable in use.

The proportional divider embodies an axially rotatable spindle having two threaded opposite end sections, each extending from a midportion of the spindle toward opposite ends thereof. The threads of each section are reversed with respect to the other section and are of different pitches in the ratio of the "golden proportion", that is, 1 to 0.618. A reference index is fixed in relation to the juncture between the spindle end sections and a movable index is mounted on a threaded support engaged and operated by each of the spindle threaded sections. In one version, particularly adaptable for dental use, the spindle is mounted in a longitudinal bore of a holder, the bore having a centralized enlargement providing a track along which the threaded supports are moved by axial rotation of the spindle. The reference index is replaceably mounted on the front face of the holder to extend perpendicularly to the axis of the spindle and the movable indices are a pair of pointers, each likewise extending perpendicularly to the spindle and replaceably mounted on a face of one of the supports. These support faces extend through a longitudinal opening in the track to align with the front face of the holder enabling all three indices to operate in coplanar relation. A feature of this divider construction is the interchangeability of the pointers whereby one set of pointers provides the indices as straight edges for drawing grid lines used, for example, in preparing dentures, and other sets of pointers utilizing pointed tips for measuring and calculating the major, minor and total lengths or distances as well as a capability for extending the range of the instrument. The holder includes appropriate scales for reading such major, minor and total lengths or spacings.

In another version of the proportional divider, adaptable for measuring relatively greater lengths, the movable indices are mounted on the free ends of a pair of spreadable legs pivoted at upper ends thereof. The spindle is mounted to extend between midportions of the legs, each end section engaging a threaded stud which is mounted to pivot in the leg midportion. A third leg, the tip of which provides the reference index, is supported by upper and lower guide posts for sliding adjustment along a reference axis parallel to but spaced from the coplanar plane of the spreadable legs and spindle. The upper guide post is supported at the upper ends of the spreadable legs by also providing the pivot pin therefor and the lower guide post is supported by and coacts with the juncture between the spindle end sections. Thus, this spindle juncture controls the position of the reference axis while rotation of the spindle separates or brings toward each other the movable legs in accordance withe respective pitches of the threaded end sections. The mounting of the movable indices on the spreadable legs are provided by adjustable pointers which extend out of the plane of the movable legs for alignment with the reference index while the sliding adjustability of the reference leg permits the reference index to be removed from alignment with the movable indices to facilitate taking measurements by the latter on a three-dimensional surface.

DESCRIPTION OF THE PREFERRED EMBODIMENTS

Figure 1:
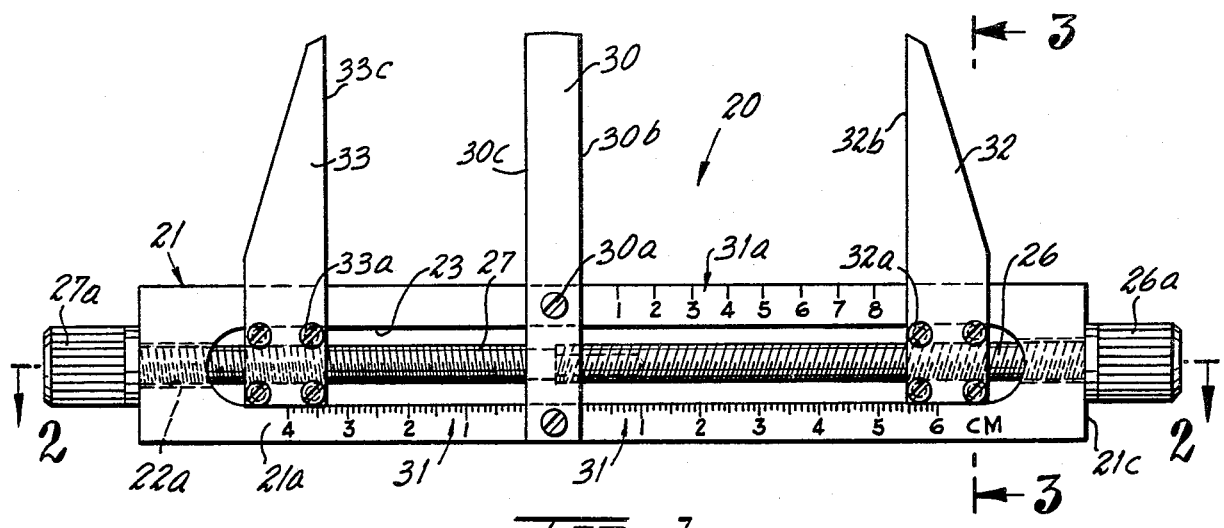
FIG. 1 is a front elevational view of a proportional divider constructed to embody the invention in which the movable pointers are mounted on riders for controlled movement along a linear track, the movable pointers being shown in an open position.
Figure 2:
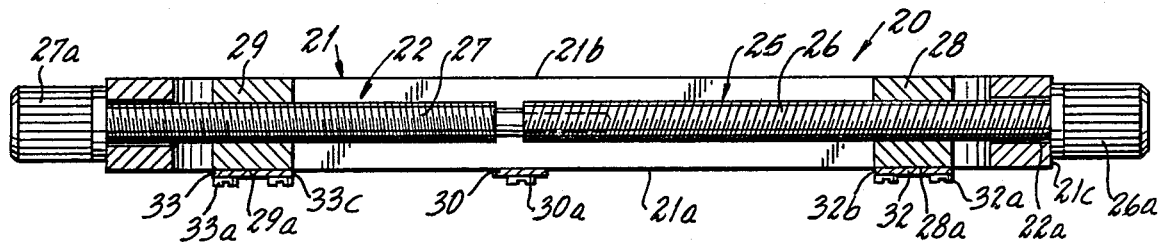
FIG. 2 is a horizontal sectional view taken on line 2—2 in FIG. 1.

Referring in detail to the drawings, 20 generally denotes a proportional divider, constructed to embody the invention, seen in FIGS. 1 to 4, inclusive, to comprise an elongated block 21 serving as a holder supporting a perpendicularly projecting fixed pointer 30, a threaded sectionalized spindle 25 and a pair of movable pointer-supporting threaded riders 28 and 29 operated by spindle 25. A longitudinal bore 22 extends through elongated block 21 and has a centralized enlargement formed between opposite end bore portions 22a providing a track 23 in which riders 28 and 29 are mounted and which opens along the length thereof onto front and rear faces 21a and 21b, respectively, of block 21.

Threaded spindle 25 is sectionalize to comprise opposite end sections 26 and 27 which engage the threaded bores of riders 28 and 29, respectively, and are suitably joined, as by a threaded connection, at a midportion of spindle 25. The threads of sections 26 and 27 are reversed with respect to each other and also have different pitches in a predetermined ratio. Spindle section 26 is greater in length than section 27 for the purpose hereinafter described and also has threads of a larger pitch, the ratio being approximately 1 to 0.618 or that of the "golden proportion". Sections 26 and 27 project through end bore portions 22a and respectively mount finger grip knobs 26a and 27a secured by suitable set screws (not shown) to the projecting free ends thereof and provide shoulders which abut the opposite ends 21c of block 21 retaining threaded spindle 25 against axial movement in bore 22.

Riders 28 and 29, threaded onto end sections 26 and 27, respectively, are sized and shaped to fit to close tolerances between the top and bottom walls of track 23 and have front faces 28a and 29a positioned with respect to front face 21a of block 21 to support movable pointers 32 and 33, respectively, to extend perpendicularly to the axis of spindle 25 on opposite sides of fixed pointer 30 for simultaneous movement toward and away from the latter upon rotation of spindle 25. To provide the versatility of interchangeable pointers hereinafter described, a pair of removable screws 30a secure fixed pointer 30 to front face 21a above and below track 23 while a plurality of removable screws 32a and 33a secure pointers 32 and 33 to riders front faces 28a and 29a, respectively. The indexing means of fixed pointers 30 are a pair of opposite, parallel, longitudinal edges 30b and 30c which extend in perpendicular relation to the axis of spindle 25 while those of movable pointers 32 and 33 are longitudinal edges 32b and 33c, respectively, which are also parallel to edges 30b and 30c. A scale 31, herein shown to be in metric units, is located on front face 21a along the lower edge of track 23 to align zero markers with fixed pointer edges 30b and 30c and to increase toward the right, as seen in FIG. 1 to be read by alignment with the lower end of longitudinal edge 32b of movable pointer 32 to indicate the major length of the divider setting and to also increase toward the left to be read by alignment with the lower end of longitudinal edge 33c of movable pointer 33 to indicate the minor length of the divider setting. A scale 31a may also be provided along the upper edge of front face 21a to be read by alignment with longitudinal edge 32b of movable pointer 32 and to indicate the total length of the divider setting.

Figure 5:
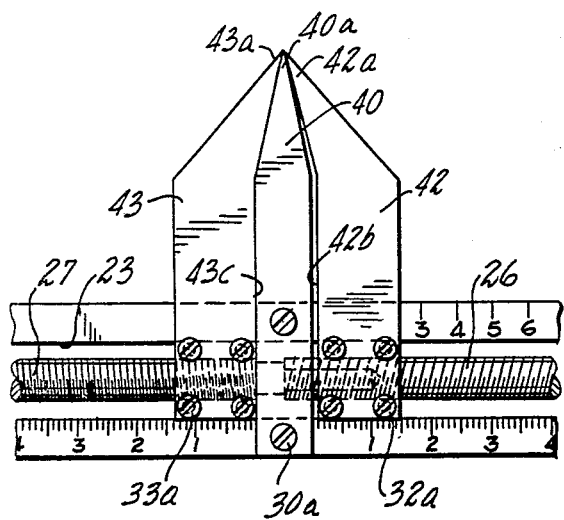
FIG. 5 is a fragmentary front elevational view of the divider shown in FIG. 1 with the fixed and movable pointers replaced by a modified set of pointers which are shown in closed position.

A more conventional type of indexing means for divider 20 is shown in FIG. 5 wherein fixed pointer 40 and movable pointers 42 and 43 replace fixed pointers 30 and movable pointers 32 and 33, respectively. Fixed pointer 40 tapers at the outer end thereof to a pointed tip 40a providing the fixed index between movable pointers 42 and 43 which taper and converge toward each other to terminate in pointed tips 42a and 43a, respectively, as the movable indices. The interior and lower edge portions 42b and 43c of movable pointers 42 and 43 correspond to the lowers ends of longitudinal edges 32b and 33c of movable pointers 32 and 33, respectively, and likewise serve in reading scales 31 and 31a.

Figure 4:
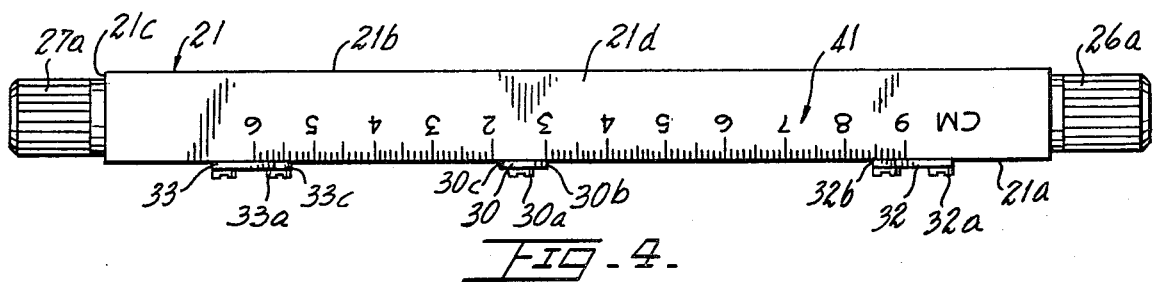
FIG. 4 is a top plan view of the divider shown in FIG. 1.
Figure 6:
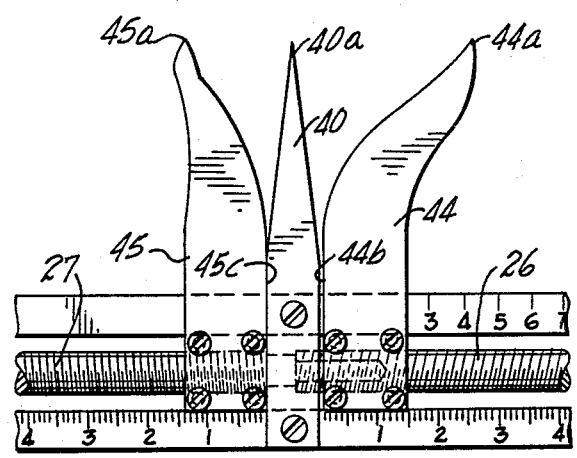
FIG. 6 is a fragmentary front elevational of the divider shown in FIG. 5 but with the pair of movable pointers replaced by a pair of movable pointers for an expanded range to be read on the scale shown in FIG. 4.

FIG. 6 shows a pair of movable pointers 44 and 45 which replace movable pointers 42 and 43 but are intended for use in combination with fixed pointer 40 to expand the range of divider 20. Movable pointers 44 and 45 diverge from fixed pointer 40 and terminate in pointed tips 44a and 45a, respectively, as the movable indices. Measurements by tips 44a and 45a are read on scale 41 which is located on top surface 21d of block 21 as shown in FIG. 4. The interior edge portions 44b and 45c of movable pointers 44 and 45 emerging above top surface 21d, as seen from the rear of block 21, align with the markings on scale 41 for reading the measurements relating to the positions of indices 44a and 45a, respectively.

Figure 14:
FIG. 14 is a straight line divided into "golden proportion" segments.
Figure 3:
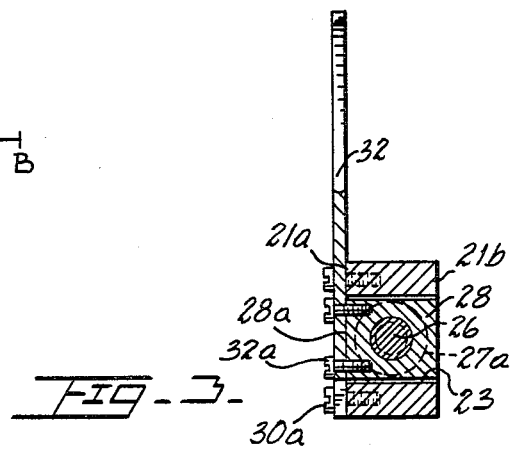
FIG. 3 is a vertical sectional view taken on line 3—3 in FIG. 1.

The practical utility and operation of divider 20 will now be apparent. For a clear understanding of the "golden proportion", the straight line ACB, shown in FIG. 14, is divided into two segments, namely, minor length AC and major length CB wherein line lengths ACB/CB=CB/AC. This relationship can only hold true when CB/AC=1.618 or AC/CB=0.618 and when assigned the simplest values whereby CB=1, then AC=0.618. This ratio is recognized as the "golden proportion" and is maintained in all settings of divider 20.

To operate divider 20, block 21 may be grasped for support in one hand but leaving riders 28 and 29 and the movable pointers attached thereto unobstructed. One of the knobs 26a or 27a may then be grasped between the thumb and index finger of the other hand for rotating spindle 25 in one direction to separate riders 28 and 29 and in the opposite direction to bring riders 28 and 29 toward each other.

When fitted with fixed pointer 30 and movable pointers 32 and 33, as seen in FIGS. 1 to 4, inclusive, divider 20 is particularly useful in determining tooth sizes and proportions in fashioning dentures. By rotating spindle 25, the major length, namely, the distance between edge 30b of fixed pointer 30 and edge 32b of movable pointer 32 is set to the width of the central incisor either by direct measurement or by aligning edge 32b with the marking on scale 31 indicating the desired width. The corresponding minor length, namely, the distance between edge 30c of fixed pointer 30 and edge 33c of movable pointer 33 will then indicate a width for the lateral incisor to achieve aesthetic appeal, which width may also be read on scale 31 by the position of edge 33c. Carried a step further, by setting the major length to the lateral incisor width thus obtained, the minor length now shown on divider 20 will indicate the width of the adjacent cuspid. The widths of the lateral incisor and cuspid thus determined is the apparent widths when the teeth are viewed directly from the front. By turning pointers 30, 32 and 33 face down on a sheet of paper, longitudinal edges 30b, 30c, 32b and 33c may be used as straight edges to draw the lines in spaced relation directly from the settings of divider 20 outlined above to facilitate the construction of grids for tooth arrangement as described in the Edwin I. Levin article entitled "Dental Esthetics and the Golden Proportion", published in The Journal of Prosthetic Dentistry, Sept. 1978, Vol. 40, No. 3, pp 244–252.

When fitted with fixed pointer 40 and movable pointers 42 and 43, shown in FIG. 5, divider 20 has the indices thereof in the form of a fixed pointed tip 40a and movable tips 42a and 43a all of which lie in a straight line in all positions of movable pointers 42 and 43. This enables a single measurement of any one of the three distances involved in the "golden proportion", namely, total length ACB, minor length AC or major length CB of a representative line shown in FIG. 14, to be set between tips 42a and 43a, 43a and 40a or 40a and 42a, respectively, and thereby ascertain the other two distances.

While preserving compactness for easy handling, the length of block 21 is selected to provide a desired measuring capability for divider 20, herein shown as a total length of approximately 9 cm comparable to a major length of about 5.5 cm. Although the range of adjustability of divider 20 is fixed by the effective length of track 23, this range may be increased by shaping the movable pointers so that the index forming tips thereof are spaced at selected distances from the fixed pointer index in accordance with the "golden proportion" when riders 28 and 29 are in a fully retracted position. Thus, movable pointers 44 and 45 when fully retracted, as seen in FIG. 6, coact with fixed pointer 40 to have a minimum measuring capability of 3 cm for the major length between movable index 44a and fixed index 40a and a corresponding minor length between movable index 45a and fixed index 40a. This provides the capability of measuring major lengths between 3 and 8.5 cm and corresponding minor lengths which values may be read by the alignment of scale 41, seen in FIG. 4, with the interior edge portions 44b and 45b of pointers 44 and 45, respectively, seen in FIG. 6. In the same manner, if desired, sets of movable pointers may be provided to further increase the maximum measurable lengths within the 9 cm span between minimum and maximum settings of riders 28 and 29 in track 23. Corresponding interchangeable scales may also be provided having suitable removable screws (not shown) to be superimposed on scale 41.

Another form of divider embodying the invention for measuring and determining "golden proportion" ratios of lengths greater than those measurable by divider 20 on larger sized objects is shown in FIGS. 7 to 13, inclusive. Proportional divider 50 comprises a pair of spreadable legs 60 and 70 pivoted at the upper ends 61 and 71 thereof, an in-between reference leg 80 slidingly supported in a reference axis a—a spaced from and parallel to the pivotal plane of legs 70 and 80 by a pair of spaced guide posts 51 and 53, and a threaded spindle 55 for adjusting the angular relation between legs 60 and 70 and axis a—a.

Figure 11:
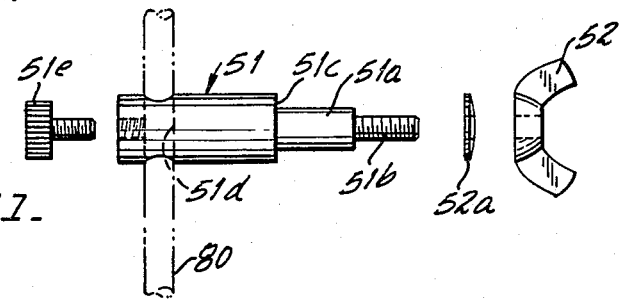
FIG. 11 is an exploded side view of the upper guide post with the pivoted legs removed, the slidable reference leg being indicated in phantom.
Figure 7:
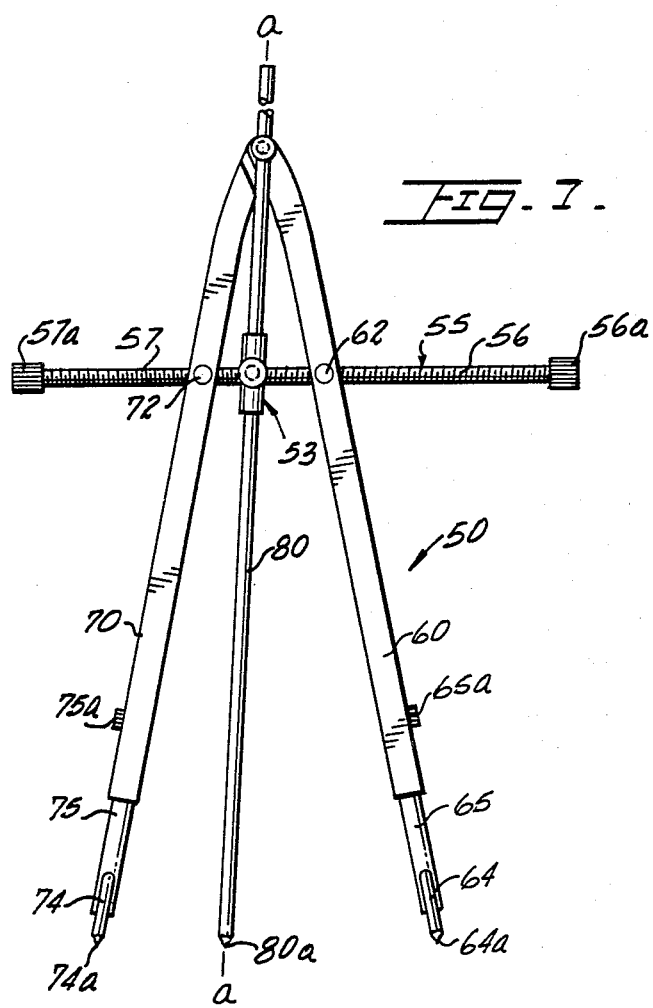
FIG. 7 is a front elevational view of a form of proportional divider embodying the invention in which the movable pointers are mounted on the free ends of a pair of pivoted legs.
Figure 8:
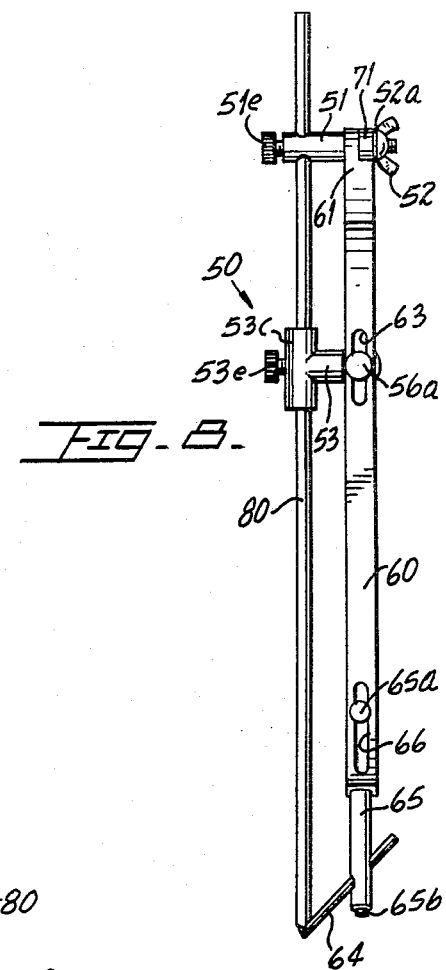
FIG. 8 is a right side elevational view of the divider shown in FIG. 7.
Figure 9:
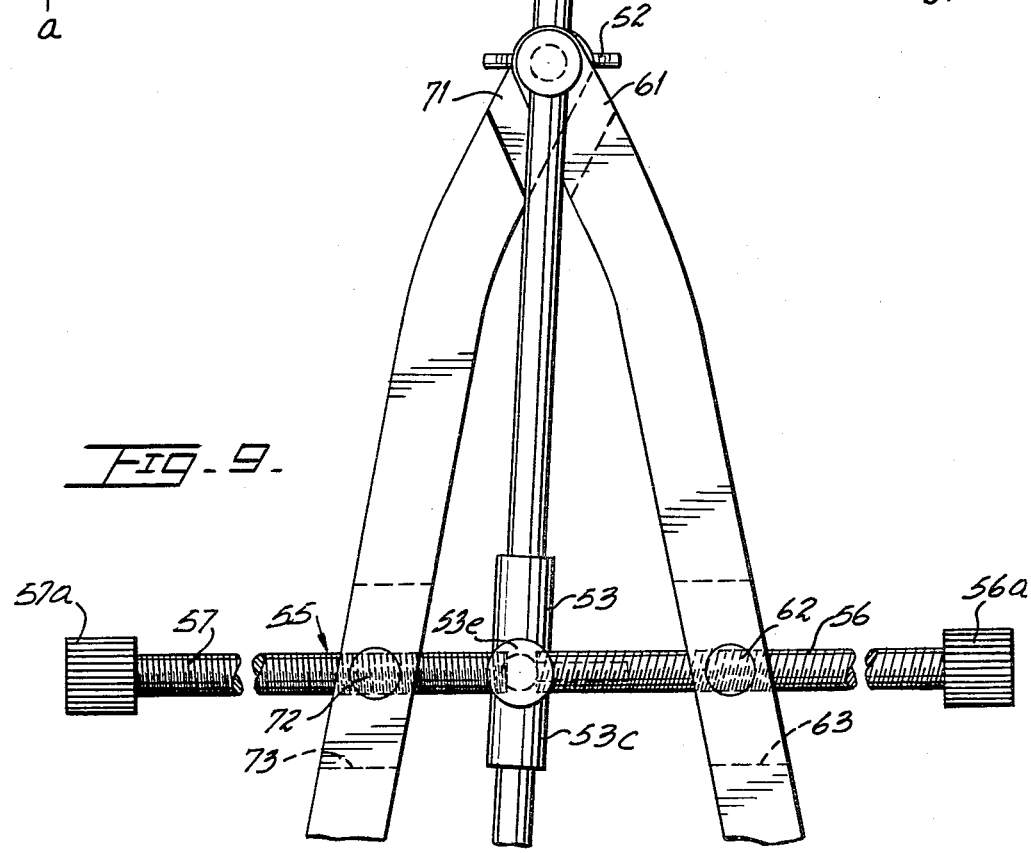
FIG. 9 is an enlarged fragmentary front elevational view of the divider of FIG. 7 showing details of construction.

As seen in FIGS. 7, 8 and 11, upper pivoted ends 61 and 71 of legs 60 and 70, respectively, are suitably cut away in a reduced thickness to dispose legs 60 and 70 in coplanar pivoted relation. Upper guide post 51, being supported by as well as pivotally connecting leg upper ends 61 and 71, has a cylindrical bearing surface 51a located on a midportion thereof and extending as a pivot pin through suitable aligned openings formed in leg upper ends 61 and 71. Bearing surface 51a is defined on the inner end thereof by shoulder 51c and has a threaded end portion 51b extending from the outer end thereof. A tension washer 52a and wing nut 52 are mounted on threaded end portion 51b to retain guide post 51 in engagement with leg ends 61 and 71 and, coacting with shoulder 51c, provide adjustable tension and locking for the pivotal connection.

Figure 13:
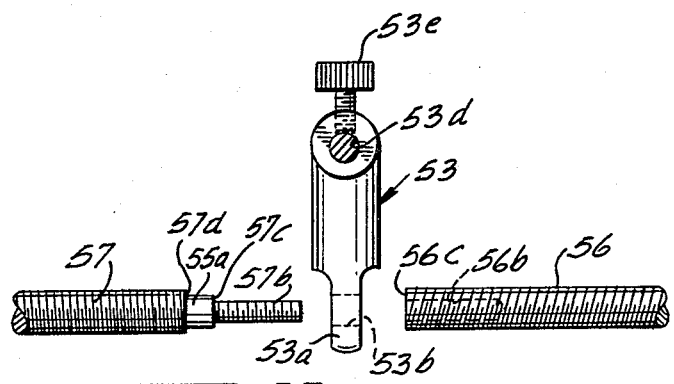
FIG. 13 is an exploded view of the connecting ends of the spindle sections and the lower guide post as seen from above.

Threaded spindle 55 is sectionalized and has opposite end sections 56 and 57 which engage and extend through the threaded bores of studs 62 and 72 pivotally mounted to extend across slots 63 and 73 formed in midportions of legs 60 and 70, respectively. The threads of spindle sections 56 and 57 are reversed with respect to each other and of different pitches in the ratio of approximately 1 to 0.618, section 56 being the longer and having the larger pitch, all in the manner similar to sections 26 and 27 of spindle 25. Spindle sections 56 and 57 terminate at the free ends thereof beyond studs 62 and 72 in finger grip knobs 56a and 57a, respectively, and are threadedly connected at adjacent ends at a midportion of spindle 55, the latter being provided with bearing surface 55a which rotatably engages the bore 53b extending through a narrow end portion 53a of lower guide post 53. As shown in FIG. 13, bearing surface 55a may be provided on section 57 adjacent male component 57b of the threaded connection between sections 56 and 57. The female component 56b of the threaded connection extends as a threaded axial bore from the inner end 56c of section 56. Bearing surface 55a is formed as a step between inner and outer shoulders 57c and 57d, the inner shoulder 57c being between male component 57b and bearing surface 55a, outer shoulder 57d being between bearing surface 55a and the exposed threads of section 57. Thus, when sections 56 and 57 are fully assembled with lower guide post 53, the inner end 56c of section 56 abuts inner shoulder 57c which is of smaller diameter enabling the exposed portion of inner end 56c to coact with outer shoulder 57d in abutting to close tolerances the opposite sides of narrow end portion 53a of lower guide post 53 permitting rotation of spindle 55 in bore 53b.

Upper guide post 51 has a transverse bore 51d spaced a predetermined distance from the plane of legs 60 and 70 and sized to slidingly accommodate leg 80 therethrough, leg 80 and bore 51d being shown circular in cross-section, although a non-circular cross-section may be utilized should it be found desirable to prevent axial rotation of leg 80. In order to distribute any binding force due to torque exerted by a tendency to pivot on bearing surface 55a, lower guide post 53 has a general T-shape configuration providing a sleeve 53c having an axial bore 53d located to align with bore 51d of upper guide post 51 and sized to snugly and slidingly receive leg 80 therethrough. Any suitable means may be provided to lock leg 80 in a desired position against movement along axis a—a. For example, a thumb screw 51e may be mounted on upper guide post 51 to thread into bore 51d, or a thumb screw 53e may be similarly mounted on sleeve 53c threading into bore 53d. Preferably, a single thumb screw may be provided to interchangeably fit either guide post 51 or 53.

Figure 10:
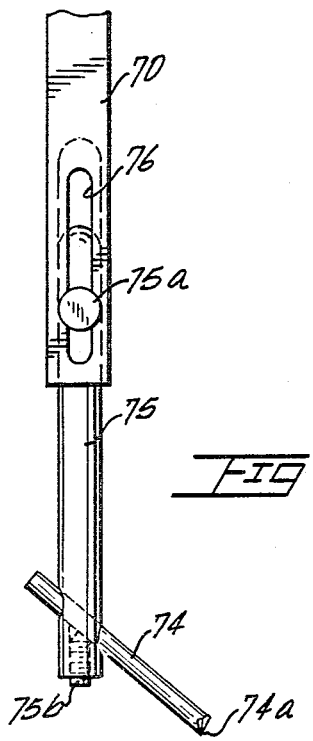
FIG. 10 is an enlarged fragmentary left side elevational view of the lower free end of the leg of the divider shown in FIG. 7 showing details of the adjustable attachment of the pointer.
Figure 12:
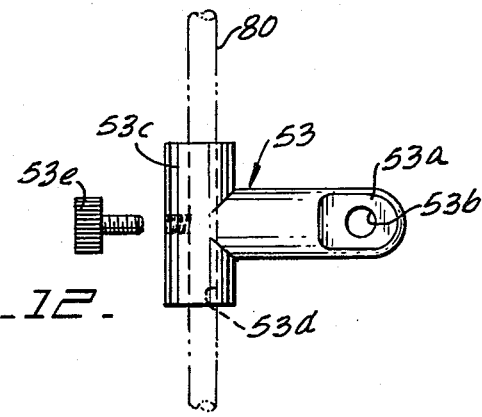
FIG. 12 is an exploded side view of the lower guide post removed from the spindle, the slidable reference leg being indicated in phantom.

A pointed tip 80a terminating the lower end of leg 80 provides the reference index between the variable indices provided as pointed tips 64a and 74a of pointers 64 and 74 which terminate the free ends of legs 60 and 70, respectively. For maximum adjustability in positioning tips 64a and 74a with respect to each other and to tip 80a, pointers 64 and 74 are carried by telescoping extensions 65 and 75 which are mounted for extension and retraction in suitable axial bores formed in the free ends of legs 60 and 70, respectively. Locking of extensions 65 and 75 in adjusted positions is provided by thumb screws 65a and 75a which project through longitudinal slots 66 and 76 adjacent the free ends of legs 60 and 70, respectively. To enable alignment of pointed tips 64a and 74a as the variable indices in a straight line with tip 80a serving as the reference index, pointers 64 and 74 extend through inclined passageways formed adjacent the ends of extension 65 and 75 and may be retained in adjusted positions therein by suitable means, herein shown as set screws 65b and 75b located in threaded axial bores formed in the end portions of extensions 65 and 75, respectively, as indicated in FIG. 10.

Rotation of spindle 55 by knob 56a or 57a will adjust the distance between legs 60 and 70 while, by means of guide post 53, maintaining leg 80 in a reference axis a—a whereby the distances between indices 64a, 80a and 74a, 80a are also maintained in the ratio of 1 to 0.618, the "golden proportion", when indices 64a, 80a and 74a are adjusted to lie in a straight line as shown in FIGS. 7 and 8, hereinafter referred to as the line of index alignment which, in the illustrated embodiment, is coplanar with axis a—a. Also, in the initial assembly and calibration of divider 50, telescoping extensions 65 and 75 are preferably identically positioned in legs 60 and 70, respectively, to provide equal effective lengths thereof so that the line of index alignment is parallel to the axis of spindle 55. The accuracy of this initial setting diminishes slightly as the distance between the movable indices 64a and 74a increases which may be remedied by recalibration readily accomplished by adjusting the position of extension 65 or 75 or both and thereby dispose the line of index alignment in a non-parallel relation with the spindle axis. A calibration template (not shown) may be provided for use with divider 50 and have accurately spaced depressions for each of the points B, C, and A defining the "golden proportion", as illustrated in FIG. 14, for lines of various lengths. Adjustments to extensions 65 and 75 may easily be accomplished whereby indices 64a, 80a and 74a register with and fit their respective depressions in the template.

When rotating spindle 55 to vary the angular relation between legs 60 and 70 in taking measurements with divider 50, the distance between guide posts 51 and 53 also varies requiring leg 80 to be free for relative sliding movement with respect to at least one of the guide posts 51 and 53.

When taking measurements on relatively large threedimensional objects, leg 80 may be moved upwardly in guide posts 51 and 53 for clearance by fixed index 80a enabling adjustment of movable indices 64a and 74a, by rotation of spindle 55, to the desired total length unobstructed by any projecting surfaces of the object. Thereafter, by returning fixed index 80a to the line of index alignment, the corresponding major and minor lengths are determined. For example, in making "golden proportion" determinations for the human face and assuming the hairline and soft tissue menton (bottom of the chin) locations as predetermined, after setting movable indices 64a and 74a to the distance between these points, the "golden" location of the nasion (depth of the bridge of the nose) should be at the minor length from the hairline and the major length from the soft tissue motion, whereas, the lateral alar rim (bottom side edge of the nose) should be at the major length from the hairline and the minor length from the soft tissue menton.

It is contemplated, within the scope of the invention, that reference leg 80 and movable legs 60 and 70 may be modified to position the line of index alignment in other than the plane of axis a—a as hereinbefore described and shown in FIGS. 7 and 8. To this end, the lower portion of reference leg 80 may be provided with a structure similar to telescoping extensions 65, 75 and inclined pointers 64, 74 as well as suitable means for preventing axial rotation of leg 80 in bores 51d and 53d of guide posts 51 and 53, such as, keying or a non-circular cross-sectional configuration. When all three legs are so provided with inclined pointers, the latter may be adjusted to dispose the line of index alignment in any desired plane. Also, in addition to the modification of leg 80, legs 60 and 70 may be modified by replacing inclined pointers 64, 74 and set screws 65b, 75b by simple pointed tips at the free ends of telescoping extensions 65, 75. In this latter modification, the inclined pointers provided on leg 80 will be adjusted to locate the line of index alignment in the plane of legs 60 and 70.

Instead of the adjustable mounting shown in FIG. 10, pointers 64, 74 may be integrally formed with extensions 65, 75 and the three index tips suitably fashioned of or coated with plastic or rubber material to reduce any hazard of sharp metal points.

Other modifications of divider 50 within the scope of the invention may include any suitable clamping means for performing the slidable support and locking function of bores 51d and 53d and thumb screws 51e and 53e of guide posts 51 and 53, respectively. Whereas, one or both thumb screws 51e or 53e may be adjusted to provide a slight friction against leg 80 taking up any play in bores 51d and 53d to prevent undesirable and accidental movement of leg 80 along axis a—a, an auxiliary resilient spring means may be provided for this purpose, such as a leaf spring (not shown) which may be mounted on either guide posts 51 and 53 to apply a resilient force against leg 80.

For practical purposes, the "golden proportion" is often expressed in round figures as 8 to 5, that is, 1 to 0.625 and accordingly any reference herein and in the claims to a ratio of approximately 1 to 0.618 shall be understood to include the 8 to 5 ratio.

The "golden" proportional dividers herein disclosed are seen to achieve the several objects of the invention and to be well adapted to meet conditions of practical use. As various possible embodiments might be made of this invention, and as various changes might be made in the disclosed dividers, it is to be understood that all matters herein set forth or shown in the accompanying drawings are to be interpreted as illustrative and not in a limiting sense.

What is claimed is:

1. A proportional divider comprising an elongated holder having a longitudinal bore formed with a centralized enlargement providing a track, a rotatable spindle extending through said bore and projecting from said holder at, at least, one end thereof, a terminal knob mounted on said projecting spindle end for manually rotating said spindle, said spindle having two threaded portions, each extending from a midportion of the spindle toward opposite ends thereof, the threads of said portions being reversed with respect to each other and being differently pitched in a ratio approximating 1 to 0.618, threaded means mounted in said track and engaging each of said spindle portions, said holder having a front face onto which said track opens along the length thereof, a reference index including a pointer mounted on said holder front face to extent perpendicularly to the axis of the spindle in a fixed predetermined relation with respect to said spindle midportion, each of said threaded means having a front surface extending into said track front face opening for guided displacement of these along said opening, and a pair of movable indices, each being mounted on one of said threaded means front surfaces and including a pointer disposed perpendicularly to said spindle for movement in said ratio toward and away from said reference pointer on manual axial rotation of said spindle by said knob.

2. The divider defined in claim 1 in which said reference pointer has a pair of opposite parallel longitudinal edges extending in said perpendicular relation to the spindle axis and forming said reference index, each of said movable pointers having a longitudinal edge extending parallel to and facing one of said reference pointer edges and forming said movable indices.

3. The divider defined in claim 1 in which said reference pointer tapers to a pointed tip forming said reference index, each of said movable pointers having an end portion converging toward said reference pointer and tapering to a pointed tip forming said movable index, said reference pointer taper and said movable pointer convergence positioning said three indices in close proximity when said threaded means are located in a fully closed position on said spindle.

4. The divider defined in claim 1 in which said reference pointer tapers to a pointed tip forming said reference index, each of said movable pointers having an end portion diverging away from said reference pointer and tapering to a pointed tip forming said movable index, said movable pointer divergence positioning said three indices in a spaced apart predetermined relation when said threaded means are located in a fully closed position on said spindle to extend the range of measurement.

5. The divider defined in claim 4 in which said holder has a top surface, said reference and movable pointers having portions extending beyond said top surface positioning said reference tip and movable tips at a spaced distance thereabove, said extending portions of the movable pointers having scale indexing means, a scale for reading distances between said reference tip and each of said movable tips set by said spindle, said scale being located on said holder top surface aligning with said scale indexing means for reading said settings.

6. The divider defined in claim 1 in which each of said threaded means front faces carries a scale indexing means, a scale for reading distances between said reference index and each of said movable indices set by said spindle, said scale being located on said holder front face aligning with said scale indexing means for reading said settings.

7. The divider defined in claim 1 in which said reference pointer and said movable pointers are a plurality of interchangeable pointer sets having different measuring capabilities, each set having a reference pointer and a pair of movable pointers, means for interchangeably mounting a reference pointer from a selected set on said holder front face, and means for interchangeably mounting the pair of movable pointers from said selected set on said threaded means front surfaces.

8. The divider defined in claim 1 in which both ends of said spindle project from said holder and have a terminal knob mounted on each end, said knobs abutting opposite ends of said holder for retaining said spindle against axial movement within said longitudinal bore.

9. A proportional divider comprising a pair of spreadable legs pivoted at upper ends thereof to extend in coplanar relation in a first plane and each mounting a movable index on the lower end thereof, an upper and a lower guide post supporting said reference leg for adjustably sliding along a reference axis, each guide post providing a positioning point determining the location of said reference axis to extend between said spreadable legs and in a second plane spaced from and parallel to said first plane, a spindle having two threaded sections, each extending from a midportion toward opposite ends of the spindle, the threads of said sections being reversed with respect to each other and being differently pitched in a ratio approximating 1 to 0.618, threaded means pivotally mounted in a midportion of each of said spreadable legs engaging one of said spindle threaded sections supporting said spindle for axial rotation in said first plane to effect an angular adjustment between said spreadable legs, a pin portion for said spreadable leg pivot axially extending from said upper guide post supporting the latter at said reference axis positioning point, said lower guide post being formed with a bearing in which said spindle midportion is journaled in a fixed location with respect to said spindle threaded sections whereby said reference axis positioning point of said lower guide post is maintained in all adjustments of said spindle, said reference leg and spreadable legs having coacting means to dispose said reference index and said movable indices in a predetermined line of index alignment along which distances between the reference index and the movable indices are measured in accordance with said ratio for various settings by said spindle.

10. The divider defined in claim 9 in which said spreadable legs coacting means include retractable extensions for independent adjustment of the effective lengths of said spreadable legs to vary said line of index alignment in calibrating said indices.

11. The divider defined in claim 9 in which said coacting means of the third leg and spreadable legs locate said line of index alignment in said second plane.

12. The divider defined in claim 9 in which said coacting means of the third leg and spreadable legs locate said line of index alignment in said first plane.

13. A proportional divider comprising a pair of spreadable legs extending in a coplanar relation in a first plane, pivot means connecting upper ends of said legs for pivoting on a pivotal axis, each leg mounting a movable index on the lower end thereof, a reference leg mounting a reference index on a lower end thereof, an upper and a lower guide post having aligned bores through which said reference leg extends for adjustably sliding along a reference axis, said aligned bores determining the location of said reference axis to extend between said spreadable legs and in a second plane spaced from and parallel to said first plane, a spindle having two threaded sections, each extending from a midportion toward opposite ends of the spindle, the threads of said sections being reversed with respect to each other and being differently pitched in a predetermined ratio other than 1 to 1, threaded means pivotally mounted in a midportion of each of said spreadable legs engaging one of said spindle threaded sections supporting said spindle for axial rotation in said first plane to effect an angular adjustment between said spreadable legs, said upper guide post being supported by said pivot means and locating said bore thereof to position said reference axis to intersect said pivotal axis, said lower guide post being supported by said spindle midportion with said bore thereof located to maintain said reference axis in a fixed predetermined relation with respect to said spindle threaded portion, said reference leg and spreadable legs having coacting means to dispose said reference index and said movable indices in a predetermined line of index alignment along which distances between the reference index and the movable indices are measured in accordance with said predetermined ratio for various settings by said spindle.

14. The divider defined in claim 13 in which said upper guide post has said bore formed adjacent one end and an opposite end portion formed as a pivot pin of said pivot means, said pivot pin terminating in a threaded end portion, a tension washer and finger manipulatable nut engaging said guide post threaded end portion for adjusting tension or locking said pivotal connection.

15. The divider defined in claim 13 in which at least one of said guide post bores has manually adjustable means for locking said third leg in a selected position.

16. The divider defined in claim 13 in which said lower guide post is T-shaped, the bottom of said T-shape being formed with a bearing in which said spindle is journaled as said support, the top of said T-shape forming a sleeve through which said bore extends.

* * * * *